Patented May 6, 1947

2,420,108

UNITED STATES PATENT OFFICE 2,420,108

PROCESS FOR TREATING A SOLVENT-EXTRACTED PETROLEUM DISTILLATE WITH CLAY AND LIME

Reginald K. Stratford, Corunna, Ontario, and Oldrich S. Pokorny, Sarnia, Ontario, Canada, assignors to Standard Oil Development Company, a corporation of Delaware No Drawing. Application July 13, 1944, Serial No. 544,818

6 Claims. (Cl. 196—41)

This invention relates to improved oils, and to the manufacture thereof, more particularly it relates to the separation of improved special mineral oils such as turbine oil, etc., and to a particular process for making such improved oil.

Heretofore, special oils suitable for use as turbine oil, hydraulic oil, transformer oil, etc., have been made largely by acid treating a light lubricating oil base stock and then subsequently washing the acid-treated oil with water to remove most of the acids dissolved and suspended in the oil, followed by a treatment with either clay or a neutralizing agent or both. Recently attempts have been made to use solvent extracted mineral oils in place of acid-treated oils, but these operations have not been attended with the desired success. For instance, considerable difficulties have been encountered by way of increased acidity experienced by clay treating phenol-treated Columbian oils with activated clay, even though such oils have not been acid treated, and when such clay treating is carried on in the presence of lime good neutralization results are obtained but the decolorizing power of the clay is markedly decreased by adding the lime.

It has now been discovered that although the above described combination treatment is unsatisfactory for Columbian oils, which are not only rich in aromatic constituents, but also relatively rich in naphthenic constituents, including naphthenic acids, this particular combination process can be used with surprisingly good efficiency with oils of a predominately more paraffinic nature such as those derived from a Mid-Continent crude.

Broadly, the invention comprises therefore, treating with clay and lime a solvent extracted light mineral lubricating oil base stock having a ratio of paraffinic to naphthenic constituents of more than 2 to 1, and preferably more than 3 to 1. Instead of a Mid-Continent oil, a Pennsylvanian type oil could also be used, or a mixture of two or more predominantly paraffinic oils.

The solvent extraction may be carried out according to known methods by treating the original oil with a selective solvent for aromatic and unsaturated compounds, such as by treating with phenol, liquid sulfur dioxide, nitrobenzene, etc., or by treating with a mixture of two or more selective solvents with or without the addition of non-solvents or precipitating solvents such as alcohol, water and the like, followed of course by separation of the aromatic extract layer from the raffinate, and the removal of any dissolved solvents from the latter.

The treatment with clay and lime according to the present invention is then carried at a temperature between the approximate limits of about 180 to 600° F., preferably at about 350–500° F. Contrary to the experience with acid-treated oils in which case subsequent treatment with clay and neutralizing agent simultaneously give very poor results from a decolorizing point of view whereas treatment first with clay and later with neutralizing agent gives good results, in the present invention involving the use of solvent-treated oils having a high ratio of paraffinic to naphthenic constituents, the clay and neutralizing agent may be used simultaneously with good results. It should be understood however that if desired the clay may be added first then later the neutralizing agent, or just the reverse.

The clay to be used may be any of the types known to those skilled in the art such as Attapulgus, Florida earth, diatomaceous earth, bentonite, etc., which may either be used as they originally occur in nature, after suitable drying, or after activation by one of various known means such as by heating or acid-treating (as in the case of Super Filtrol), etc. or a combination of such activation steps. The amount of clay to be used with ordinarily range between the approximate limits of 1 and 15%, and preferably about 2 to 10% by weight of the oil being treated.

The neutralizing agent to be used is preferably hydrated lime, although the invention is intended to apply broadly to any of the alkaline earth neutralizing agents such as the oxides or hydroxides or even carbonates of the various alkaline earth metals. For instance, in place of calcium hydroxide one may use magnesium oxide, barium hydroxide, and the like, or for mixtures of two or more different neutralizing agents. It is preferable not to use caustic soda or other alkali metal neutralizing agent in this process as such agents may promote emulsification. Although it is not desired that the invention be unnecessarily limited by theory as to the mechanism of the operation of the invention, it is believed that one reason for the success for this invention is that traces of acidic material, probably naphthenic acids, present in the oil are removed by adsorption on the hydrated lime during the treatment with activated clay. The amount of lime or other neutralizing agent to be used should be about 0.2 to 2.0% by weight on the oil treated, preferably about 0.5 to 1.0% by weight.

The product obtained by the operation of this invention is an oil of increased stability to oxidation and of good resistance to emulsion, being substantially free from small amounts of oil soluble sodium and iron soaps which tend to cause emulsion and which have been found in oils produced by other methods used heretofore such as by rerunning over lye. Even though solvent-extracted oils have not actually come in contact with sulfuric acid (as is the case with acid-treated oils) treatment with clay alone will not produce a finished oil of satisfactory low acidity (neutralization number) and other properties. The oils produced by this invention however have a low S. E. number (steam emulsion number according to the A. S. T. M. steam emulsion test D157–28) this S. E. number being generally below 50, preferably below 40, and sometimes even below 35. These oils also have good resistance to oxidation as may readily be ascertained by subjecting them for instance to a 72 hours' Staeger oxidation test at 230° F. with copper catalyst and then determining the Tag. Robinson colour, neutralization number, interfacial tension and S. E. number. The improved results, after subjection to the oxidation tests, are shown by a substantial increase in the Tag. Robinson colour and in the interfacial tension, and a substantial reduction in neutralization number and S. E. number.

Although it is not desired that the invention be unnecessarily restricted to the use of mineral oil stock of a certain viscosity range, it is believed particularly applicable to oils of the turbine oil viscosity range.

The objects and advantages of the invention will be better understood from a consideration of the following experimental data.

*Example I*

A phenol extracted Mid-Continent turbine oil having a Saybolt viscosity of about 316 seconds at 100° F. was subjected in three different tests to clay contacting at 420° F., in one test without any hydrated lime and in the other two tests with ½ and 1% respectively of hydrated lime along with the clay. The results of these tests are shown in the following table.

| Test No. | 1 | 2 | 3 |
|---|---|---|---|
| Per cent clay (Filtrol) | 5 | 5 | 5 |
| Per cent Hydrated Lime, Ca(OH)₂ | | ½ | 1 |
| Temperature, ° F | 420 | 420 | 420 |
| Colour, Tag. Rob | 17 | 17 | 19½ |
| S. E. No | 66 | 38 | 30 |
| 72 Hrs. Staeger Oxidation Test @ 230° F. with Copper Catalyst: | | | |
| Colour, Tag. Robinson | 1 | 1¼ | 12¾ |
| Neutralization No | 0.10 | 0.06 | 0.04 |
| Interfacial Tension | 27 | 36 | 37 |
| S. E. No | 1200+ | 614 | 523 |
| Steam Jet Emulsion Test: | | | |
| Substantial Separation, Mins | | 60 | 8 |
| ml. Emulsion after 24 hrs | 38 | 2 | 1 |

The above tests show that clay treatment of the phenol extracted Mid-Continent turbine oil without any hydrated lime gave a product which had a steam emulsion number of 66, which is excessive, whereas with ½% of hydrated lime it was reduced to 38 and with 1% of hydrated lime down to 30. The 1% of hydrated lime also improved the Tag. Robinson color. The use of hydrated lime also improved the resistance of the oil to oxidation as shown by the fact that after the 72 hrs. Staeger oxidation, the interfacial tension was only 27 in the sample which had not been treated with hydrated lime, but was 36 and 37 in the two samples that had been treated with ½ and 1% of hydrated lime along with the clay. The lime also greatly reduced the emulsifying tendencies of the oil after oxidation as shown by the reduction of the S. E. number from over 1200 down to 614 and 523 respectively with ½ and 1% of lime, and by reducing the steam jet emulsion value from 38 without any lime to 2 and 1 with lime. As shown in test 3 the use of 1% of lime produced a very unexpected improvement in Tag. Robinson colour after oxidation, namely a colour of 12¾ compared to a colour of 1 without any lime and 1¼ with ½% of lime, so that for best results namely in order to obtain a turbine oil having both a low steam emulsion number before and after oxidation, and also retaining good colour after oxidation, it is desirable to use an amount of hydrated lime approximating 1%, i. e., together with the 5% clay treat. The lime also lowered the slightly excessive neutralization number of .10 to about .05 which is a satisfactory value.

*Example II*

Another series of tests was carried out in a phenol extracted Mid-Continent turbine oil base stock. This oil was subjected to clay treating with Filtrol either alone or with lime, and the test results shown in the following table were obtained:

| Test No. | Filtrol, per cent | Lime, per cent | Temp., ° F. | Colour, Rob. | S. E. No. | Colour after B. B. (Staeger) Oxid. Test | Interfacial Tension after oxidation |
|---|---|---|---|---|---|---|---|
| 4 | ¹6 | | | 19½–20 | 80 | 3–5 | |
| 5 | 5 | | 420 | 17 | 66 | 1 | 27.2 |
| 6 | 6 | | 420 | 19 | 85 | 3(2¼) | 28.1 |
| 7 | 5 | ½ | 420 | 17 | 38 | 1¼ | 35.5 |
| 8 | 5 | 1 | 420 | 19½ | 20(30) | 12¾(11½) | 37.0 |
| 9 | 6 | 1 | 420 | 18 | 29 | 8¾ | 27.5 |
| 10 | 6 | 1 | 420 | 17¼ | 22 | 10½ | 40.7 |
| 11 | 6 | 1 | 420 | 18 | 25 | 9½ | 37.8 |
| 12 | 6 | 1 | 420 | 19¼ | 30 | 11 | 37.5 |
| 13 | 6 | 1 | 420 | 19 | 15 | 11¼ | |

¹ Rerun over lye before clay treating.

The above table shows that in tests 4, 5 and 6 where the oil was clay treated without any lime, the S. E. number (steam emulsion number) ranged from 66 to 85, while in test number 7 in which ½% of lime was used the S. E. number was reduced to 38, and in tests 8 to 13 inclusive in which 1% of lime was used with either 5 or 6% of clay, the S. E. number was reduced to values ranging from 30 down to 20. It is also noted that in tests 8 to 13 in which 1% of lime was used, the colour after the oxidation ranged from about 8 to 13, whereas with no lime or ½% of lime the colour was very much poorer (namely from 1 to 5).

*Example III*

In another set of four tests a phenol extracted Mid-Continent turbine oil distillate was rerun over lye, and then subjected to clay treating without or with lime, using several proportions of clay and lime, with the results shown in the following table:

| Test No. | Filtrol, per cent | Lime, per cent | Temp., °F. | Colour, Rob. | S. E. No. | Colour after B. B. (Staeger) Oxid. Test | Interfacial Tension after oxidation |
|---|---|---|---|---|---|---|---|
| 14 | 3 | ------ | 420 | 19¼ | 39 | 3 | ------ |
| 15 | 4 | ------ | 420 | 20¼ | 25 | 4½ | 26.2 |
| 16 | 3 | 1½ | 420 | 19½ | 43 | 4¾ | 27.2 |
| 17 | 4 | 1 | 420 | 19¼ | 18 | 4¼ | 27.2 |

The data in this table show that the best results here were obtained with at least 4% of clay and with 1% of lime, giving a steam emulsion number of 18 compared to other values ranging from 25 to 43. These tests also show that even with as much as 1½% of lime the amount of clay used should not be reduced as low as 3%.

Example IV

Another series of four tests was carried out by blending together 45% by volume of phenol extracted Mid-Continent lubricating oil of SAE grade 10, with 55% by volume of phenol extracted Mid-Continent lubricating oil base stock of grade SAE 30, and then subjecting the resultant blend, without or with lime, to clay treatment using a different (slightly less effective) Filtrol clay than was used in Examples I, II and III. The results obtained are shown in the following table:

| Test No. | Filtrol, per cent | Lime, per cent | Temp., °F. | Colour, Rob. | S. E. No. | Colour after B. B. (Staeger) Oxid. Test | Interfacial Tension after oxidation |
|---|---|---|---|---|---|---|---|
| 18 | 4 | ------ | 420 | 18 | ------ | 3½ | ------ |
| 19 | 5 | ------ | 420 | 18¼ | ------ | 3 | 30.7(31.2) |
| 20 | 4 | 1 | 420 | 18 | ------ | 4 | ------ |
| 21 | 5 | 1 | 420 | 18¾ | ------ | 7 | 35.5 |

Although steam emulsion numbers were not obtained for this series of tests, it is apparent that the colour after oxidation was raised from 3 or 3½ in tests 18 and 19, to 4-7 in tests 20 and 21 in which the hydrated lime was used; and it is also noted that the interfacial tension after oxidation was better (higher) in the case of the lime-treated sample than the one without lime.

Example V

A set of two tests was carried out by subjecting a dewaxed phenol-treated paraffin distillate to clay treatment without and with lime, with the following results:

| Test No. | Filtrol, per cent | Lime, per cent | Temp., °F. | Colour, Rob. | S. E. No. | Colour after B. B. (Staeger) Oxid. Test | Interfacial Tension after oxidation |
|---|---|---|---|---|---|---|---|
| 22 | 4 | ------ | 400 | 17¾ | 85 | 1¾ | 21 |
| 23 | 3 | ¾ | 400 | 17¾ | 49 | 2 | 29 |

These two brief tests show that an addition of even as low amount as ¾% of lime when substituted in place of part of the 4% of clay used made a very great reduction in the S. E. number from 85 to 49, very slightly raised the colour after the oxidation, and greatly increased the interfacial tension after oxidation from 21 up to 29.

Example VI

A brief set of two tests was also made on a phenol-extracted Mid-Continent lubricating oil base stock of SAE grade 30, treating both of these with Filtrol but one without lime and the other with lime, the test results being as follows:

| Test No. | Filtrol, per cent | Lime, per cent | Temp., °F. | Colour, Rob. | S. E. No. | Colour after B. B. (Staeger) Oxid. Test | Interfacial Tension after oxidation |
|---|---|---|---|---|---|---|---|
| 24 | 4 | ------ | 440 | 16¾ | 100 | 1½ | 22 |
| 25 | 4 | ¾ | 440 | 18 | 45 | 5½ | 33 |

These two tests show that the use of ¾% of hydrated lime in addition to the 4% of Filtrol greatly reduced the emulsion tendency as indicated by a drop in S. E. number from 100 to 45, improved the colour after oxidation from 1½ to 5½ and improved the interfacial tension after oxidation from 22 to 33.

All of the above experimental data indicate that unexpectedly good results are obtained by treating a phenol-extracted Mid-Continent oil of the turbine oil viscosity range with activated clay in the presence of hydrated lime, and preferably with 4 to 7% by weight of clay with 0.75 to 1.25% by weight of hydrated lime.

It is not intended that this invention be limited to the specific materials which have been recited merely for the sake of illustration, but only by the appended claims in which it is intended to claim all novelty inherent in the invention as well as all modifications coming within the scope and spirit of the invention.

It is claimed:

1. The process which comprises subjecting a phenol-extracted petroleum distillate of the turbine oil, hydraulic oil and transformer oil viscosity range and having a ratio of paraffinic to naphthenic constituents of at least 3 to 1, to treatment with activated clay in the presence of hydrated lime at a temperature of about 350–500° F. to produce a stabilized refined oil of improved resistance to oxidation and emulsification.

2. Process according to claim 1 in which the oil treated is a phenol-extracted Mid-Continent oil.

3. Process according to claim 1 using about 1 to 15% by weight of clay and about 0.2 to 2.0% of hydrated lime.

4. Process according to claim 1 using about 4 to 7% by weight of activated clay and about 0.75 to 1.25% by weight of hydrated lime.

5. The process which comprises subjecting a phenol-extracted Mid-Continent petroleum distillate of the turbine oil viscosity range to a treatment at about 350–500° F. with about 4 to 7% by weight of activated clay in the presence of about 0.75 to 1.25% by weight of hydrated lime to produce a stabilized refined oil of low emulsification tendencies and of improved resistance to oxidation.

6. The process which comprises subjecting a phenol-extracted petroleum distillate of the gas oil to light lubricating oil boiling range and having a ratio of paraffinic to naphthenic constituents of greater than 2 to 1, to treatment with activated clay in the presence of lime at a temperature of about 350–500° F. to produce a stabilized refined oil of improved resistance to oxidation and emulsification.

REGINALD K. STRATFORD.
OLDRICH S. POKORNY.

REFERENCES CITED

The following references are of record in the file of this patent:

UNITED STATES PATENTS

| Number | Name | Date |
|---|---|---|
| 2,361,455 | Chechot | Oct. 31, 1944 |
| 2,352,064 | Zerbe | June 20, 1944 |
| 2,183,783 | Bray | Dec. 19, 1939 |
| 2,070,383 | Tuttle | Feb. 9, 1937 |
| 2,293,591 | Chenault | Aug. 18, 1942 |
| 1,973,621 | Govers | Sept. 11, 1934 |
| 1,896,583 | Hoover | Feb. 7, 1933 |